United States Patent [19]
Bott

[11] 3,951,320
[45] Apr. 20, 1976

[54] LUGGAGE RACK

[76] Inventor: John A. Bott, 931 Lake Shore Drive, Grosse Pointe Shores, Mich. 48236

[22] Filed: May 15, 1974

[21] Appl. No.: 470,263

Related U.S. Application Data

[63] Continuation of Ser. No. 60,662, Aug. 3, 1970, abandoned.

[52] U.S. Cl. .................. 224/42.1 D; 224/42.1 E; 52/716
[51] Int. Cl.² ......................................... B60R 9/04
[58] Field of Search ............... 224/42.1 E, 42.1 R, 224/42.1 F, 29 R, 42.1 D; 52/716, 718

[56] References Cited
UNITED STATES PATENTS

| 2,521,271 | 9/1950 | Wiley | 52/718 |
| 2,833,011 | 5/1958 | Scott | 52/718 |
| 2,919,841 | 1/1960 | Helm | 224/42.1 E |
| 3,120,914 | 2/1964 | Smith | 224/42.1 E |
| 3,451,602 | 6/1969 | Bott | 224/42.1 E |
| 3,460,728 | 8/1969 | Adamson | 224/42.1 R |

Primary Examiner—Robert J. Spar
Assistant Examiner—Jerold M. Forsberg
Attorney, Agent, or Firm—Harness, Dickey & Pierce

[57] ABSTRACT

A luggage rack in which the luggage supporting platform consists of parallel load supporting slats mounted on the vehicle roof by means of cross straps. The cross straps have resilient clips which snap fit into the undersides of the slats to hold the slats to the cross straps. The cross straps are made in two sections with an adjusting screw between them. The adjusting screw permits the tensioning of the cross straps after they are mounted on the vehicle to draw the slats tight against the roof.

6 Claims, 10 Drawing Figures

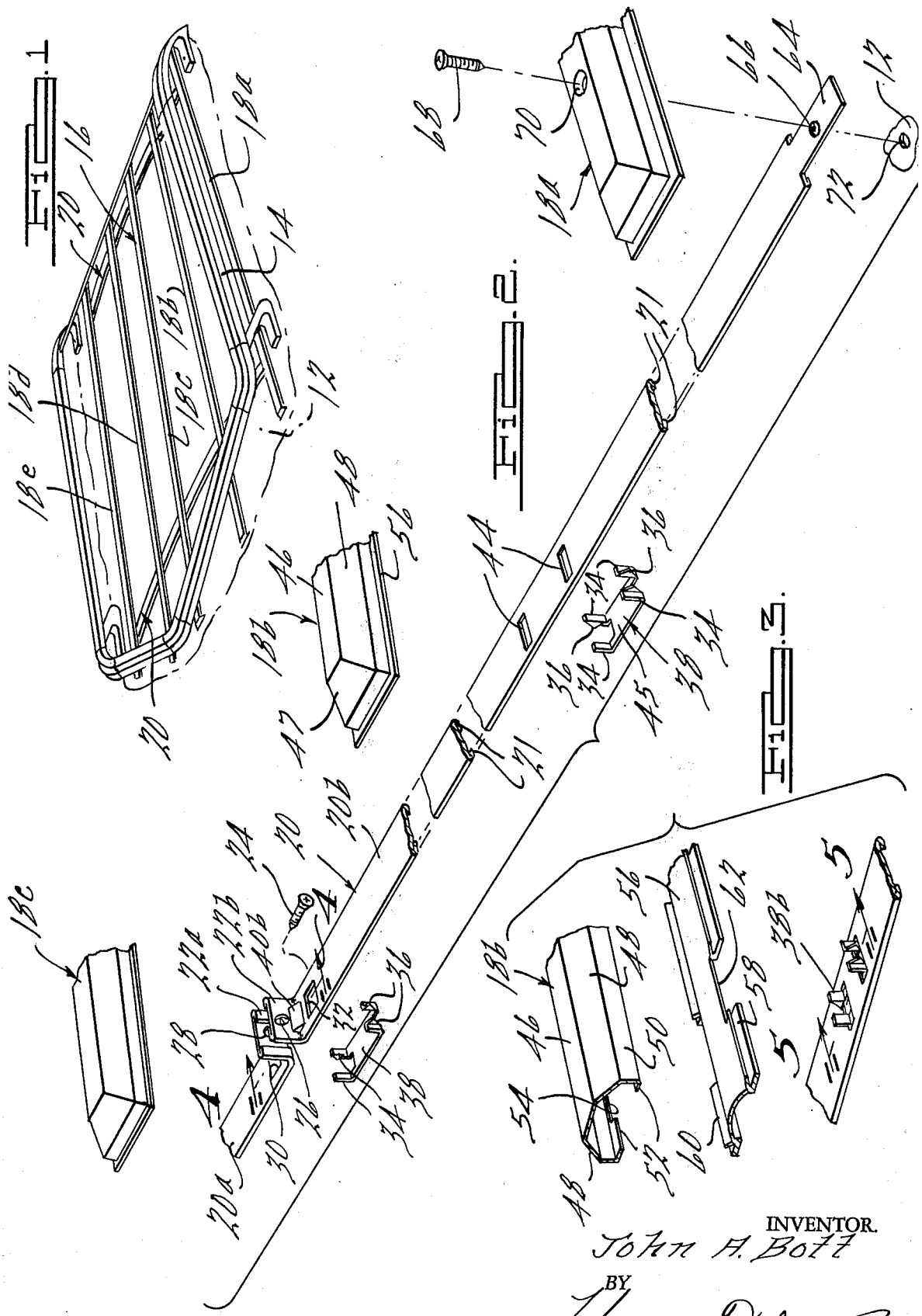

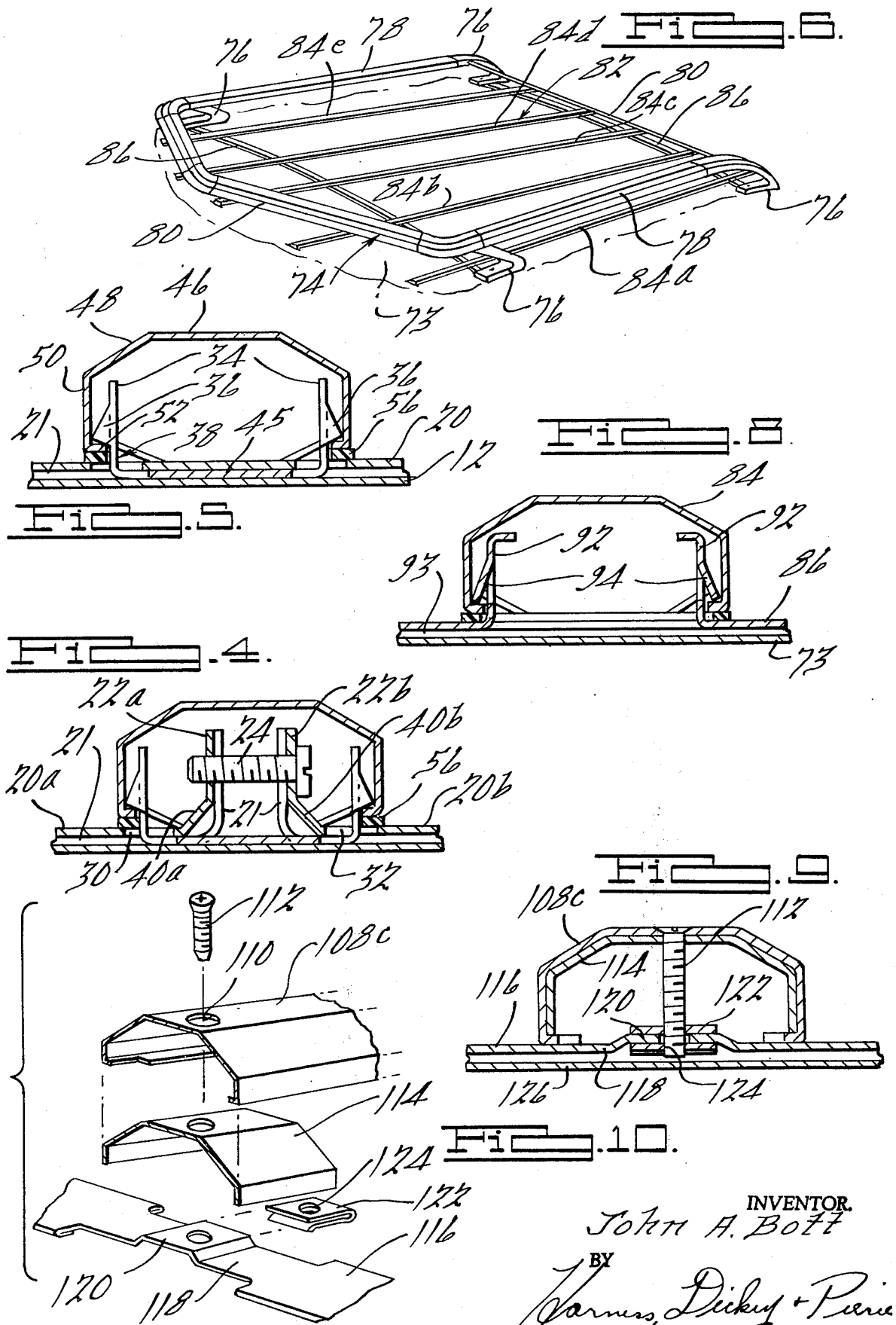

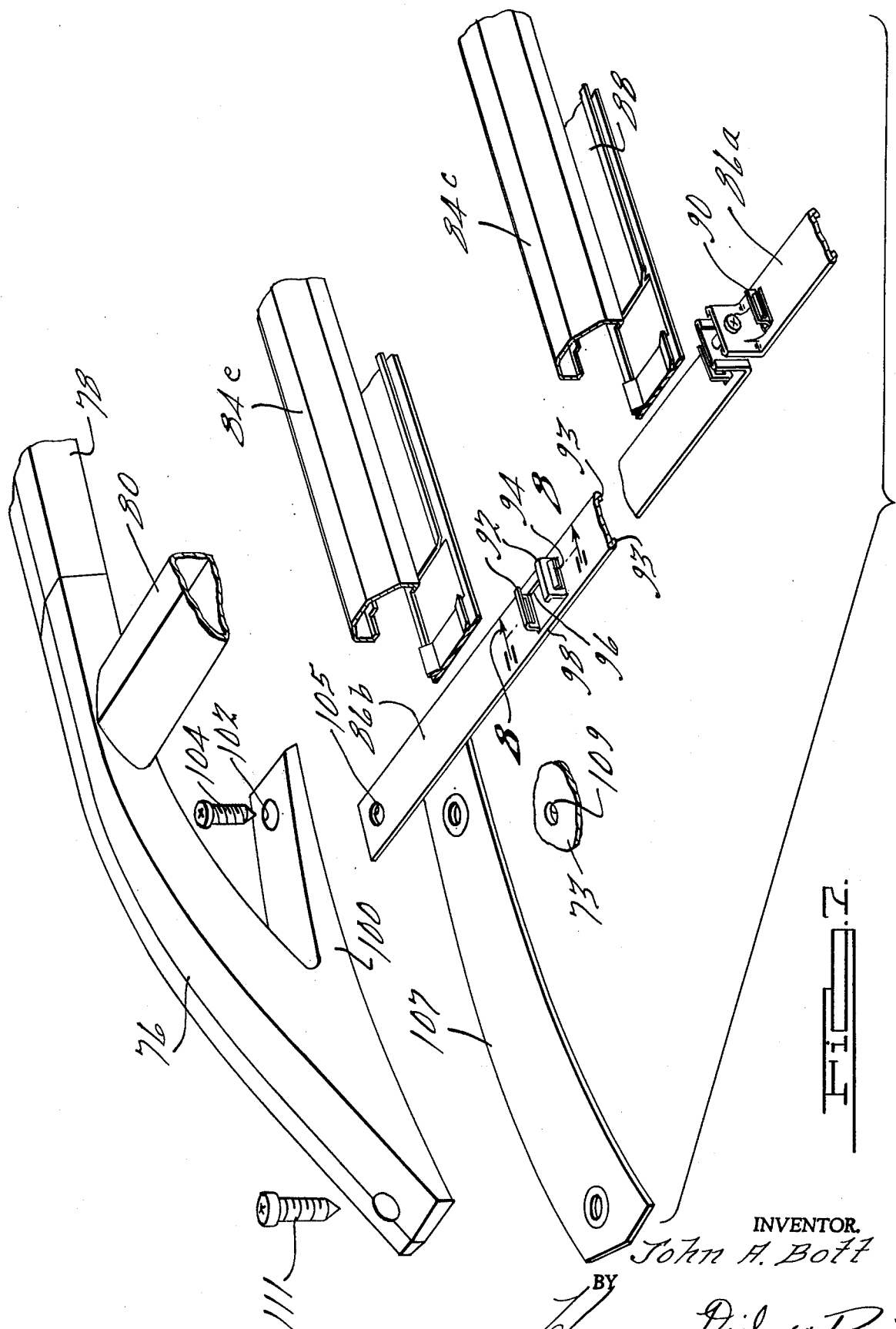

LUGGAGE RACK

This is a continuation of application Ser. No. 60,662 filed Aug. 3, 1970, now abandoned.

This invention relates to luggage racks and particularly to a luggage rack having a novel and improved luggage supporting platform.

SUMMARY OF THE INVENTION

The usual automobile luggage rack consists of two parts: a framework which projects upwardly from the vehicle roof and a platform which is positioned against the roof and enclosed by the framework. The luggage or other objects to be transported rest on the platform, while the framework is designed to restrain lateral movement of the luggage off of the platform. If desired, ropes or the like may be tied to the framework to hold the luggage in place. The platform may be either separately fastened to the roof or it may be joined to the framework and held to the roof through the framework. Platforms mounted in both ways are illustrated herein.

The present invention relates to that general type of luggage rack platform in which slats on which the luggage rests are fastened to cross straps and are positioned on the vehicle roof by means of said cross straps. The present invention constitutes an improvement in platforms of the cross strap mounted type.

It is an object of the present invention to provide a luggage rack platform which is easy to assemble and install on an automobile, which is strong and reliable in use, which is substantially free of rattles or undesired movement of its parts and which is attractive in appearance.

It is another object of the present invention to provide a luggage rack platform of the cross strap type which is relatively simple in design, which possesses a minimum number of component parts, which is relatively inexpensive to manufacture and which requires a minimum number of holes in the vehicle roof on which it is mounted.

DESCRIPTION OF THE DRAWINGS OF THE ILLUSTRATED EMBODIMENTS

FIG. 1 is a perspective view of a luggage rack incorporating a platform constructed in accordance with the present invention, the rack being shown on a fragmentarily illustrated roof;

FIG. 2 is an enlarged exploded perspective view of a portion of the structure illustrated in FIG. 1;

FIG. 3 is a further enlarged exploded perspective view of a portion of the structure illustrated in FIGS. 1 and 2;

FIGS. 4 and 5 are enlarged sectional views of the structure illustrated in FIGS. 2 and 3 taken along the lines 4—4 and 5—5 thereof, respectively, and with the parts shown in assembled relationship;

FIG. 6 is a view of structure similarly illustrated in FIG. 1, showing another form of the invention;

FIG. 7 is an enlarged exploded perspective view of a portion of the structure illustrated in FIG. 1;

FIG. 8 is an enlarged sectional view of the structure illustrated in FIG. 7 taken along the line 8—8 thereof, but with the parts shown in assembled condition;

FIG. 9 is a view of structure similarly illustrated in FIG. 7, showing a modification of the present invention; and FIG. 10 is an exploded perspective view of the structure illustrated in FIG. 9.

DESCRIPTION OF PREFERRED EMBODIMENTS

Referring now to FIG. 1, the numeral 12 designates an automobile roof on which is mounted a luggage rack consisting of a framework 14 and a platform 16. The roof 12 has a transverse curvature or crown. The framework 14 encloses the platform 16 and serves to confine luggage or other articles resting on the platform 16. The platform 16 will be seen to include a plurality of longitudinally extending slats 18 which are separately designated 18a, 18b, 18c, 18d and 18e and which are mounted on and connected to a pair of cross straps 20. In this form of the invention the cross straps 20 are secured directly to the roof 12 and the platform 16 is not directly connected to the framework 14.

Turning now to FIG. 2, the constructional details of the cross straps 20 and their manner of connection to the slats 18 is illustrated. Each of the cross straps 20 is identical and a description of one of the cross straps will, therefore, serve to describe both cross straps. Opposite lateral margins 21 of the straps 20 are turned under the central portions thereof and give the straps greater strength for their width. As may be seen, the cross strap 20 is made in two separate sections 20a and 20b. The two sections 20a and 20b are formed with adjacent upturned flanges 22a and 22b which are joined by an adjusting screw 24. The flange 22b is formed with an opening 26a through which the shank of the screw 24 freely passes while the flange 22a is formed with an opening 26b into which the screw 24 is threaded. A slot 30a is formed in the strap section 20a adjacent the flange 22a while a slot 30b is formed in the strap section 20b adjacent the flange 22b. The juncture between the flange 22a and the strap section 20a is reinforced by a boss 40a. Similarly, the juncture between the flange 22b and the strap section 20b is reinforced by a boss 40b.

Each of the slats 18b, 18c and 18d is secured to the two cross straps 20 by a pair of spring metal clips 38. The clips 38 for the slot 18c are located at the joints between the strap sections 20a and 20b. Each clip 38 is provided with two pairs of upwardly projecting arms 34 at the opposite ends thereof. The arms 34 have outwardly projecting cam fingers 42 at their upper ends. The arms 34 of the clips 38 for the slat 18c project upwardly through the slots 30 and 32 and enter the underside of the slat 18c. The arms 34 of the remaining clips 38 project upwardly through pairs of slots 44 spaced along the strap 20. A central flat portion 45 of each clip 38 lies against the underside of its strap 20 in engagement with the slat margins 21. The pairs of slots 44 are located to provide equal spacing between the slats 18a, etc.

The slats 18 vary in length, but tthey are of the same cross sectional shape. This shape is best illustrated in FIG. 3, from which it will be seen that each slat 18 has a horizontal flat upper surface 46, a pair of walls 48 which are downwardly and outwardly inclined from the surface 46 and a pair of parallel vertical walls 50 depending from the walls 48. A pair of flanges 52 project horizontally toward one another from the lower ends of the walls 50. Each of the flanges 52 has two pairs of notches 54 to receive its two clips 38 and prevent longitudinal movement between the clips and slats. It will be seen that a gasket 56 is positioned beneath each slat 18. As is illustrated in FIG. 3, each gasket 56 has a pair of flat walls 58 on which the flanges 52 rest and a pair of lips 60 which overlie said flanges. A pair of recesses 62 are provided on the opposite sides of the gasket 56 to accommodate the arms 34 of the clips 38.

The platform 16 is held to the automobile roof 12 by four self-tapping screws 68 which are threaded into four holes 72 (FIG. 2) which are drilled in the roof 12. The screws 68 pass through holes 66 formed in reduced width end portions 64 disposed at the opposite ends of the cross straps 20. The screws 68 also pass through counterbored holes 70 which are formed adjacent the opposite ends of the slats 18a and 18e. It will thus be apparent that the slats 18a and 18e are directly fastened to the roof 12 by pairs of screws 68 while the screws 68 perform the additional function of anchoring the opposite ends of the cross straps 20.

The platform 16 is installed on an automobile roof by first drilling the holes 72. The cross straps 20 and slats 18a and 18e are then installed and fastened to the roof by the screws 68. During such initial installation the spacing between the flanges 22a and 22b is substantially the maximum permitted by the length of the screw 24. After the cross straps 20 are in place the screws 24 are tightened. Due to the transverse curvature or crown of the roof 12 the tightening of the screws 24 will cause the straps 20 to be drawn tightly against the roof. It should be noted that prior to the installation of the cross straps 20, the three clips 38 which are used with each cross strap are properly positioned thereon. Two of the clips 38 on each strap 20 are associated with pairs of slots 44, while one clip 38 is associated with the slots 30 and 32. With the cross straps 20 tightened down and in place and with the arms 34 of the clips 38 projecting upwardly from the cross straps, the slats 18b, 18c and 18d are installed by simply pressing said slats downwardly onto the clips 38. In so doing, the flanges 52 will engage the cam fingers 36 and bias the pairs of arms 34 toward one another until the fingers 36 snap past the flanges. The fingers 36 thus engage the flanges 52 and prevent upward movement of said slats off of the cross straps 20. The arms 34 will abut the opposite ends of the notches 54 to prevent longitudinal movement of the slats 18b, 18c, and 18d. In the area between the two cross straps 20, the slats 18 and their gaskets 56 curve downwardly into engagement with the roof 12. Such slight curvature of the slats 18 is not readily visible and, for all practical purposes, the slats 18 appear to be lying flatly against the roof.

It will be seen that the slats 18 have closed end portions 47 (FIG. 2). Accordingly, none of the structure disposed between the walls 48 and 50 is visible from the ends of the slats 18. The clips 38 are completely hidden by the slats 18b, 18c and 18d which they retain and only the heads of the screws 68, which lie flush with the slat surfaces 46 are visible on the slats 18a and 18e. The method of assembly of the platform 16 is extremely convenient and the tightening of the straps 20 is afforded by structure which is relatively inexpensive and which is completely hidden from view once the slat 18c is installed.

FIGS. 6, 7 and 8 illustrate an alternative form of luggage rack mounted on an automobile roof 73. The luggage rack includes a framework comprising four stanchions 76 which serve to connect and locate side rails 78 and cross rails 80 to form an enclosure spaced above the roof 73. A luggage support platform, which is indicated generally by 82, is connected to the framework 74 and the platform and framework are held to the roof 73 by the same fasteners. The platform 82 includes a plurality of parallel spaced slats 84 which are separately designated 84a, 84b, 84c, 84d and 84e. The slats 84 are positioned on and connected to a pair of cross straps 86. Each cross strap 86 is made in two parts 86a and 86b. The juncture between such parts is substantially the same as that illustrated in the prior embodiment of the invention and includes a spring clip 90 by which the middle slat 84c is held on the cross straps 86 with a gasket 88 therebetween.

The form of the invention illustrated in FIGS. 6 to 8 has two primary differences over the prior form of the invention. The first of these relates to the manner of attachment of the slats 84a, 84b, 84d and 84e to the straps 86. For this purpose, the cross straps 86 are formed with pairs of integral upstanding resilient arms 92. Each pair of arms 92 lies between inwardly and downwardly folded margins 93 of the cross straps 86 and leaves an opening 96 therebetween which is bounded on its opposite sides by strip portions 98 of the straps 86. Resilient cam fingers 94 are struck from the arms 92 and project oppositely outwardly therefrom. The fingers 94 are inclined downwardly and outwardly from their points of connection to the arms 92 and function in a manner similar to the fingers 36 of the spring clips 38 in the prior embodiment of the invention. Two pairs of arms 92 are provided on the cross strap section 86a and two pairs of arms 92 are provided on the cross strap section 86b. The slats 84a, 84 b, 84d and 84e are engageable with one pair of arms 92 on each cross strap 86 for the purpose of being retained thereby on said cross straps. As will be apparent, the slats 84 may be assembled onto the cross straps by simply pushing the same down onto the appropriate arms 92 or spring clip 90 after the straps 86 have been mounted on the roof 73.

As illustrated in FIG. 7, the stanchions 76 each have a base portion 100 having a hole 102 drilled vertically therethrough. A self-tapping sheet metal screw 104 has its shank passing through the hole 102 and through a hole 105 formed in one end of a strap 86. The screw 104 also passes through a gasket 107 on which the base 100 rests and into a hole 109 drilled in the roof 73. Thus, the screws 104 serve to hold both the stanchions 76 and the straps 86 to the roof 73. An additional screw 111 also helps to hold each stanchion 76 in place. After the stanchions 76 have been installed on the roof 73 and the ends of the cross straps 86 fastened in place, the joint between the cross strap sections 86a and 86b is tightened, as was described in connection with the prior embodiment of the invention. The five slats 84 are then pressed down onto the cross straps and locked in place by the resilient arm structure described above. This form of the invention has the advantage of minimizing the number of holes that must be drilled in the roof of an automobile in order to hold the luggage rack structure in place. It will be appreciated, of course, that for retaining the slats 84a, 84b, 84d and 84e, separate spring clips can be used (such as the clip 90 or the clip 38 of the prior embodiment) in lieu of the integral arms 92. Whether integral arms or separate spring clips will be used will depend largely upon the manufacturing costs of such alternative approaches. Both the integral resilient arms 92 and the arms of separate spring clips 38 and 90 are referred to in the claims as spring clip means or resilient arm means.

FIGS. 9 and 10 illustrate an alternative adjustable joint for tightening a cross strap. A central luggage support slat 108c is illustrated which may be used in lieu of the central slat 84c or 18c. The slat 108c has a hole 110 formed in the upper surface thereof to receive the shank of a self-tapping screw 112. The slat 108 has the same cross sectional shape as the previously described slats 18 and 84. A reinforcing member 114 having a complementary cross sectional shape is positioned on the underside of the slat 108 beneath the opening 110 thereof. Extending across the slat 108c beneath the reinforcing member 114 is a cross strap 116 having a weakened portion 118 of reduced width. The portion 118 has a central boss 120 which receives a threaded reinforcing clip 122 having a threaded opening 124. The screw 112 is threaded into the opening 124 and, when tightened, will draw the clip 122 upwardly. The entire strap portion 118 is thus drawn upwardly and the portions of the strap 116 on opposite sides of the portion 118 are drawn toward one another. Thus, the tightening of the screw 112 has the effect of shortening the overall length of the strap 116. As in the previously illustrated two-part cross straps, the one-piece cross strap illustrated in FIGS. 9 and 10 has the adjustable joint thereof hidden under one of the luggage supporting slats. Only the head of the screw 112 is exposed. Furthermore, the entire tightening of the cross strap is accomplished by the rotation of a single screw. In this form of the invention, of course, the screws 112 serve to hold the slat 108c to a pair of cross straps 116 which are spaced longitudinally of the vehicle. Additional slats (not shown) on either side of the slat 108c can be held to such cross straps 116 by either separate spring clips or integral resilient arms similar to those illustrated in the prior embodiments of the invention.

What is claimed is:

1. A luggage rack platform intended for step-by-step assembly on a roof of an automobile vehicle without forming apertures in intermediate portions of said roof, comprising a pair of longitudinally spaced cross straps, means for affixing the opposite ends of each of said cross straps to an automotive roof, a plurality adjustable means for tensioning said cross straps completely received within an opening, a pair of resilient arm means carried by intermediate portions of said cross straps, and projecting upwardly, all portions of said arm means being disposed above the upper surface of said vehicle roof and held thereto only by said cross straps, whereby no portions of the vehicle roof in the vicinity of said arm means need be apertured, said resilient arm means being formed on a resilient clip which is separate from said straps and which projects upwardly through slots formed in said straps, and portions on said arm means engageable with said flanges for limiting movement of the associated slats away from said strap.

2. The structure as set forth in claim 1 in which the means affixing the opposite ends of said cross straps comprises fasteners passing through the outer ones of said slats.

3. The structure as set forth in claim 1 including a luggage rack framework having a plurality of stanchions provided with base portions and in which said means affixing the opposite ends of said cross straps comprises fasteners passing through said stanchion base portions and also serving to hold said stanchions to the vehicle roof.

4. A vehicle luggage rack platform including a pair of parallel cross straps spaced apart in the longitudinal direction of the vehicle, means for affixing the two opposite ends of each of said cross straps to a vehicle roof, a plurality of luggage supporting slats mounted on said cross straps, each of said slats having a pair of spaced side walls defining a cavity therebetween which is open to the lower surface of said slat, an adjustable joint between the opposite ends of each of said cross straps for tightening said strap between the opposite ends thereof, the joint of each of said cross straps being disposed entirely within the cavity of one of said slats and being completely concealed thereby, and a plurality of resilient arm means projecting upwardly from each of said straps, selected resilient arm means receivable entirely within the cavities of said slats securing selected ones of said slats to said straps, whereby the surfaces of said slats above said joints and said securing means are flush with remainders of the slat surfaces.

5. The structure as set forth in claim 4 in which each of said straps is made in two parts, flanges on the adjacent ends of said parts and a screw connecting said flanges for drawing said parts toward one another.

6. The structure as set forth in claim 4 in which each of said straps is made in one piece and in which said joint comprises an upwardly bendable strap portion and a screw for drawing said bendable strap portion upwardly, said screw having a head engageable with one of said slats.

* * * * *

UNITED STATES PATENT AND TRADEMARK OFFICE
CERTIFICATE OF CORRECTION

PATENT NO. : 3,951,320
DATED : April 20, 1976
INVENTOR(S) : John A. Bott

It is certified that error appears in the above-identified patent and that said Letters Patent are hereby corrected as shown below:

Column 2, line 33, change "30a" to --30--; line 34, change "30b" to --32--; line 42, change "slot" to --slat--; line 46, change "42" to --36--; and line 56, change "tthey" to --they--.

In the Claims:

Column 5, line 41, after "plurality" insert --of luggage supporting slats mountable on said cross straps, said slats including outer slats along the sides of said roof, each of said slats having a pair of spaced-apart walls provided with continuous inturned flanges at the lower ends thereof throughout the area of said cross straps defining an opening therebetween which is open to the lower surface of said slats,--

Column 6, line 4, after the comma insert --said pairs of resilient arm means carried by said cross straps projecting upwardly between said side walls of said slats, said arm means having cam fingers whereby said inturned flanges will snap past said fingers when the slats are pressed downwardly thereover,--.

Signed and Sealed this

Twenty-first Day of September 1976

[SEAL]

Attest:

RUTH C. MASON
*Attesting Officer*

C. MARSHALL DANN
*Commissioner of Patents and Trademarks*